(12) United States Patent
Gunder (10) Patent No.: US 7,950,982 B2
(45) Date of Patent: May 31, 2011

(54) METHOD FOR ACHIEVING STRIPE HEIGHT CONTROL AT BOW COMPENSATED LAPPING

(75) Inventor: Jeffrey Gunder, Los Altos, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 858 days.

(21) Appl. No.: 11/648,463

(22) Filed: Dec. 28, 2006

(65) Prior Publication Data

US 2008/0160882 A1 Jul. 3, 2008

(51) Int. Cl.
*B24B 49/10* (2006.01)

(52) U.S. Cl. .................. 451/8; 451/5; 451/55

(58) Field of Classification Search .............. 451/5, 8, 451/11, 55; 29/603.16, 603.17, 603.09, 603.12
See application file for complete search history.

(56) References Cited

U.S. PATENT DOCUMENTS

| | | | | |
|---|---|---|---|---|
| 5,525,091 A | * | 6/1996 | Lam et al. ................... | 451/1 |
| 5,607,340 A | * | 3/1997 | Lackey et al. ................ | 451/5 |
| 5,620,356 A | * | 4/1997 | Lackey et al. ................ | 451/5 |
| 6,045,431 A | * | 4/2000 | Cheprasov et al. ........... | 451/5 |
| 6,050,878 A | * | 4/2000 | Kanzo et al. ................ | 451/5 |

* cited by examiner

*Primary Examiner* — Robert Rose (57) ABSTRACT

A lapping device comprises a mounting surface for coupling at least one non-parted slider row. At least one lever arm is coupled to at least one distal end of the mounting surface. The lever arm comprises a coupling feature at an end of the lever arm for receiving a force-vectoring device. The lever arm also comprises a pivot point opposite the coupling feature of the lever arm wherein the pivot point is beyond a distal end of the non-parted slider row.

21 Claims, 10 Drawing Sheets

METHOD FOR ACHIEVING STRIPE HEIGHT CONTROL AT BOW COMPENSATED LAPPING

TECHNICAL FIELD

This invention relates generally to the field of direct access storage devices and in particular to the fabrication of sliders and control of the magnetic transducer stripe height at rough lap of a slider row.

BACKGROUND ART

Direct access storage devices (DASD) have become part of every day life, and as such, expectations and demands continually increase for better performance at lower cost. To meet these demands, the mechano-electrical assembly in a DASD device, specifically the Hard Disk Drive (HDD) has evolved to meet these demands.

In order for an HDD to hold more data, advances in the magnetic transducer as well as the disk media on which the data is written have undergone major advances in the past few years. A critical relationship between the head and disk is the spacing between their adjacent surfaces. This is typically known as the fly height.

The magnetic transducer flies above the disk by virtue of an air film created by the disk spinning next to a pattern on the surface of the slider (and magnetic transducer contained there within). This pattern on the slider is known as the Air Bearing Surface, or ABS. The ABS is fabricated on the surface of the slider that is closest to the disk. Typically the closest point on the ABS to the adjacent disk surface resides on the magnetic transducer. Typically the magnetic transducer resides at the end of the slider known as the trailing edge of the slider, so called the trailing edge because it is the last edge of the slider to fly over the disk.

Control of the fly height is critical to the density of data that can be written onto the disk surface. Of similar importance to the density of data that can be written onto the disk surface is the geometry of features inside the magnetic transducer. The feature that is critical for the write function of the magnetic transducer is known as throat height. The feature that is critical for the read function of the magnetic transducer is known as stripe height. Both stripe height and throat height are controlled by a lapping process, which establishes the initial surface on the slider for defining the ABS. The lapping process simultaneously defines the initial surface of the ABS, stripe height, and throat height.

Initially, a slider starts as a small part of a much larger wafer containing tens of thousands of potential sliders, deposited on the wafer in an array of rows and columns. A section of the wafer is cut from the wafer for processing. This section is known as a quadrant or quad. A quad typically contains several non-parted rows. Typically a row of sliders is lapped before the row is parted from the quad. The success of the lapping process for simultaneously defining the ABS, stripe height, and throat height is predicated on the quad having a sliced surface that is flat and parallel to the features inside the magnetic transducer that define stripe height and throat height.

The alignment of the features inside the magnetic transducer to each other and to the wafer, which define stripe height and throat height, are typically very precise due to the photolithographic processes that define the features' geometry and location. However, this precise alignment and location can be disturbed by stress internal to the wafer.

Internal stresses inside a wafer are in balance prior to being sliced. Once a part of a wafer (such as a row or a quad of rows) is removed, the internal stresses will typically rebalance themselves and typically distort the wafer, row, and/or quad in the process of rebalancing stresses. This distortion disturbs the alignment of the features to each other inside the magnetic transducer that define stripe height and throat height.

The problem arises as to how to mitigate this stress-induced distortion and maintain alignment of the features inside the magnetic transducer that define stripe height and throat height. Since millions of dollars are invested in current tooling, mitigation of this stress-induced distortion must have minimal impact on the existing set of tools as well as minimal impact on the fabrication process and wafer.

SUMMARY OF THE INVENTION

Various embodiments of the present invention are described herein. A lapping device comprises a mounting surface for coupling at least one non-parted slider row. At least one lever arm is coupled to at least one distal end of the mounting surface. The lever arm comprises a coupling feature at an end of the lever arm for receiving a force-vectoring device. The lever arm also comprises a pivot point opposite the coupling feature of the lever arm wherein the pivot point is beyond a distal end of the non-parted slider row.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of the current manufacturing process, the challenges the current manufacturing process attempts to overcome, and current manufacturing process shortcomings. The discussion will then focus on embodiments of the invention that allow these shortcomings to be overcome.

Overview

A wafer is received from a supplier with its surfaces ground and lapped flat and parallel and ready to enter the deposition process for building the magnetic transducer. There are tens of thousands of magnetic transducers deposited on the wafer's surface with photolithographic processes. Each photolithographic process step typically performs the same process step to each individual magnetic transducer. The alignment of the magnetic transducers to each other are typically held tightly in the nanometer range by the photolithographic process steps. Upon completion of the deposition process, the wafer has been populated with an array of precisely aligned magnetic transducer arranged in rows and columns.

The as received wafer has internal stresses that are in balance and allow the wafer as a whole, to be ground and lapped flat. In processing the wafer into individual sliders, the wafer is sliced into smaller sections known as quadrants, or quads. Depending on the size of the slider being produced, each quad may contain 30 to 60 rows, and contain several hundred potential sliders. Slicing the wafer into quads unbalances the internal wafer stresses and distorts the quads until the stresses are once again in equilibrium.

The unbalanced stresses will typically distort the sliced surface of the row into a concave or convex arc. During the row lapping process, the high points of the arc (ends or center depending if the arc is concave or convex) are the first to contact the lapping medium and will be lapped first until typically the entire row is lapped flat. Typically this will result in the magnetic transducers at these high points of the arc to be lapped excessively and ruined. For proper lapping of the ABS, stripe height, and throat height, it is very important to compensate for the distortion in the row prior to the lapping process.

It is possible to have the wafer supplier reduce the amount of internal stresses in the wafer. However, currently the price requested by the wafer supplier is excessive for the amount of stress that the supplier is capable of removing. Internal stresses still remain, and the effects still need to be mitigated.

Figure 1:
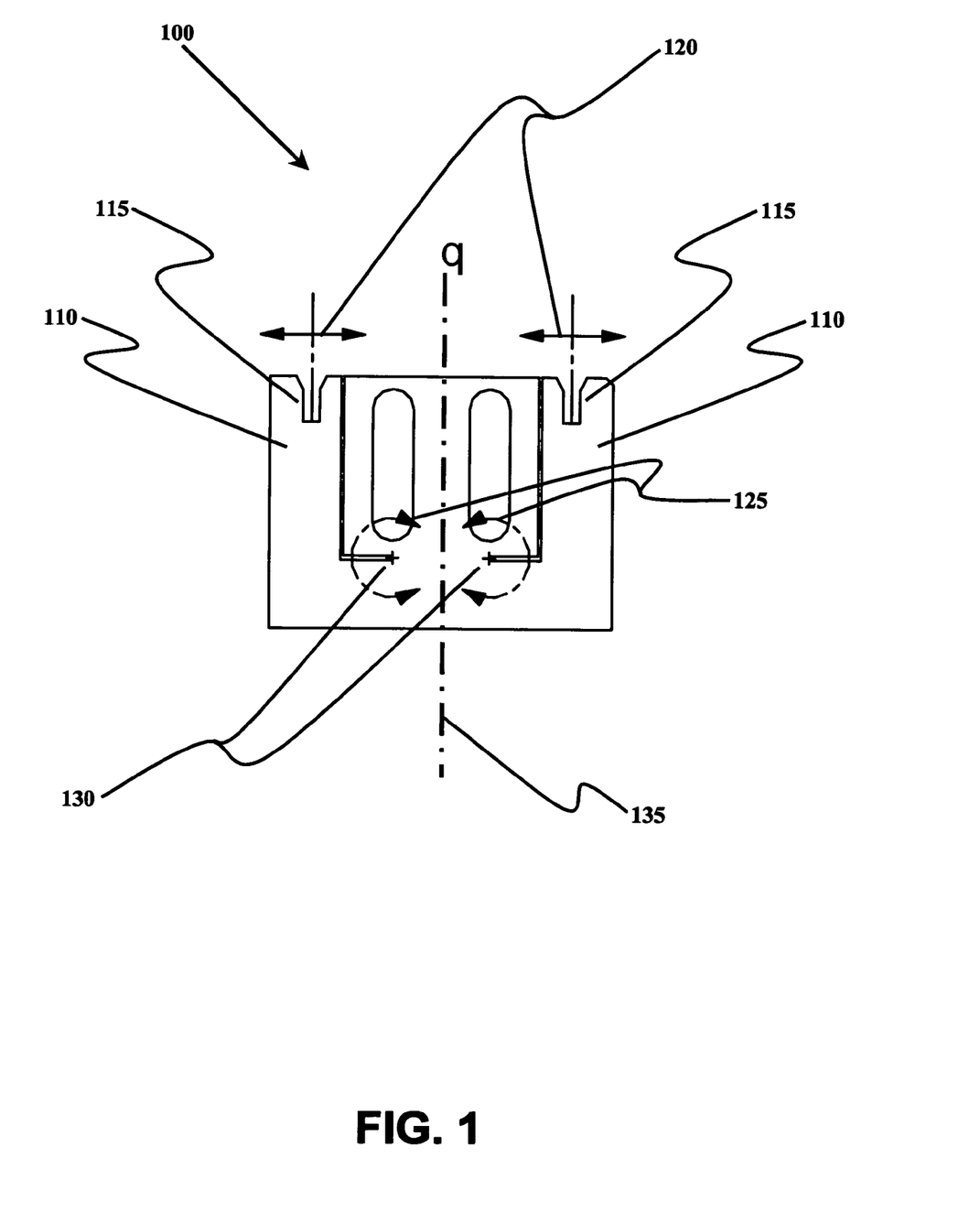
FIG. 1 is a plan view of a lapping device in accordance with current practice of a present manufacturing line.

With reference to FIG. 1, a plan view of a lapping device 100 for lapping slider-rows is shown in accordance with a current practice of a manufacturing process. Lapping device 100 comprises at least one lever arm 110. A coupling feature 115 is located at the end of lever arm 110. Coupling feature 115 receives a force-vectoring device such as a pneumatic piston or a solenoid.

For the purposes of this invention, a force vector is quantity of force that comprises both magnitude and direction. The direction of the force vector 120 can be determined by the orientation of a pneumatic piston or solenoid, which can push or pull on coupling feature 115. Pneumatic pressure delivered to a pneumatic piston or current delivered to a solenoid can determine the magnitude of force vector 120. It should be obvious to one schooled in the art that force vector 120 is not limited to horizontal or vertical orientation, and any combination of force vectors can be superimposed upon one another to produce a desirably controlled force vector 120.

Force vector 120, as well as coupling feature 115, and lever arm 110 are typically symmetric about centerline 135 of lapping device 100. By properly controlling force vector 120, rotation 125 can be produced about rotation points 130. Rotation points 130 are defined by the geometry of lapping device 100 and are opposite coupling feature 115 of lever arm 110. The geometry of lapping device 100 allows localized flexing to occur at rotation points 130 during application of force vector 120.

Figure 1A:
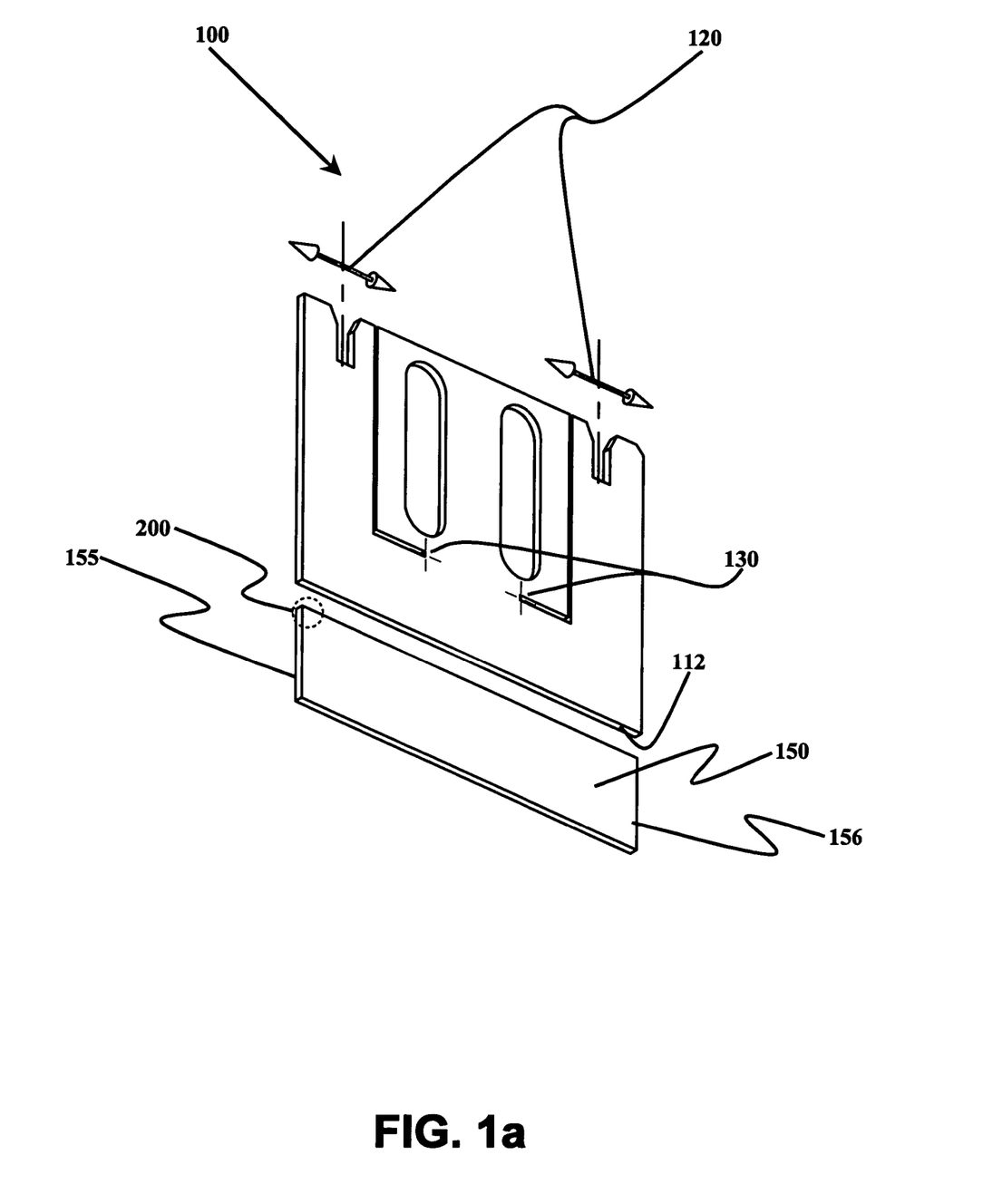
FIG. 1a is an isometric blow-apart of a lapping device and a mounted row quad in accordance with current practice of a present manufacturing line.

With reference now to FIG. 1a, an isometric blow-apart of lapping device 100 and a mounted row quad 150 is shown in accordance with a current practice of a manufacturing process. Row quad 150 is adhesively bonded to mounting surface 112 of lapping device 100. Rotation points 130 are located between distal ends 155 and 156 of row quad 150. Rotation 125 (FIG. 1) will impart a curvature into row quad 150 that approximately counteracts the distortion in row quad 150 that typically results from internal stresses in the wafer.

Figure 2:
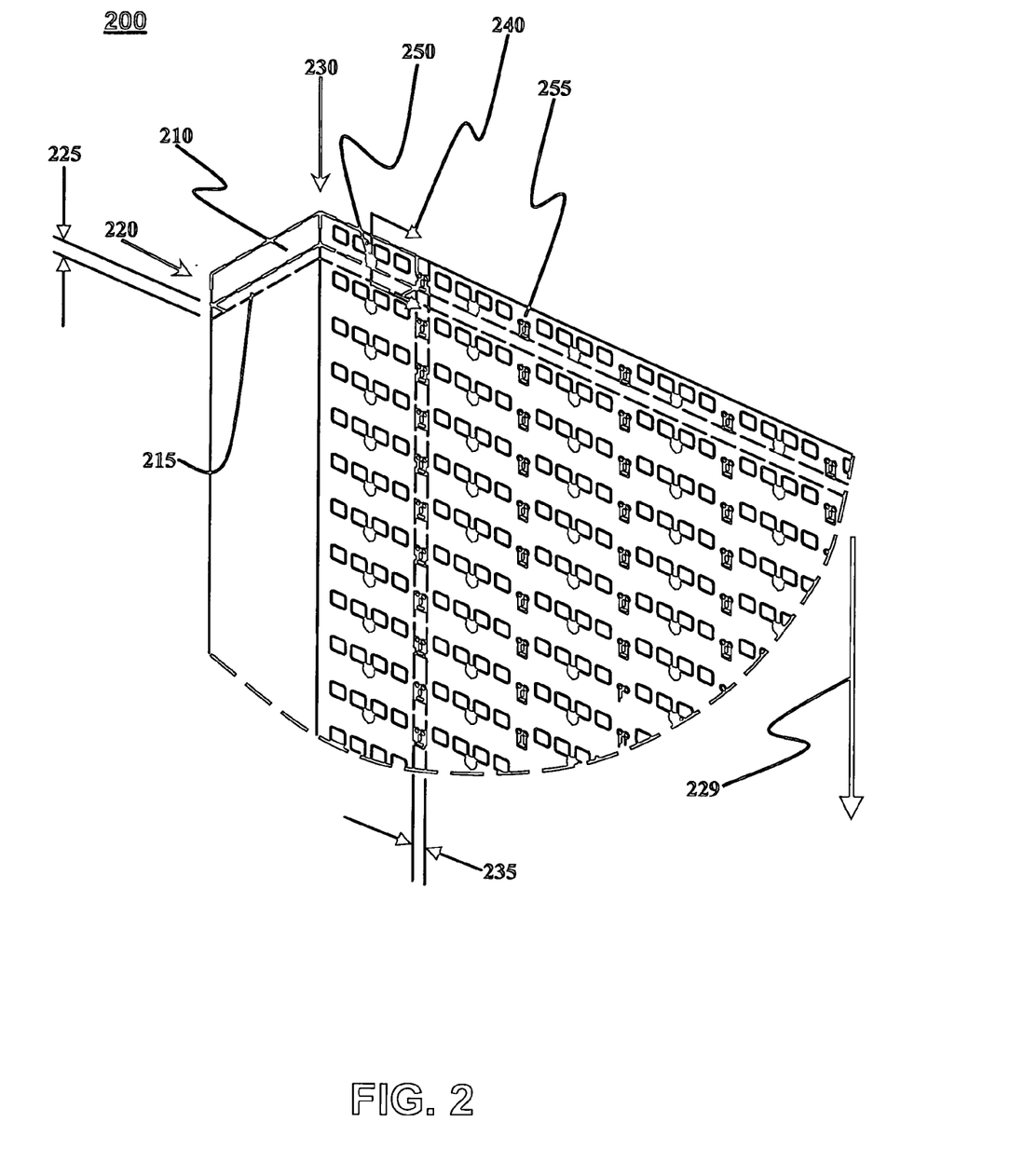
FIG. 2 is an isometric detail of a row quad in accordance with current practice of a present manufacturing line.

With reference now to FIG. 2, an isometric detail 200 of row quad 150 is shown in accordance with a current practice of a manufacturing process. A typical potential slider 210 is highlighted to indicate its relationship to other potential sliders in typical row 220 and typical column 230 of row quad 150. Typical surface 215 is lapped once preceding rows 229, which precede typical row 220 have been lapped and sliced from row quad 150. Lapping of typical surface 215 establishes the initial surface for defining an ABS for typical potential slider 210.

A slicing saw that parts preceding rows 229 from row quad 150 creates kerf 225. Kerf 225 exposes typical surface 215 for lapping. An electrical resistance-measuring device, commonly referred to as an electrical lapping guide or ELG 255, controls the lapping process. Each non-parted row has at least one ELG 255 between every other magnetic transducer 250. ELG 255 is typically removed from typical row 220 when kerf 225 is created or when kerf 235 is created during removal of typical potential slider 210 is removed from typical row 220. Cross-section line 240 exposes the features that define stripe height and throat height inside magnetic transducer 250.

Figure 3:
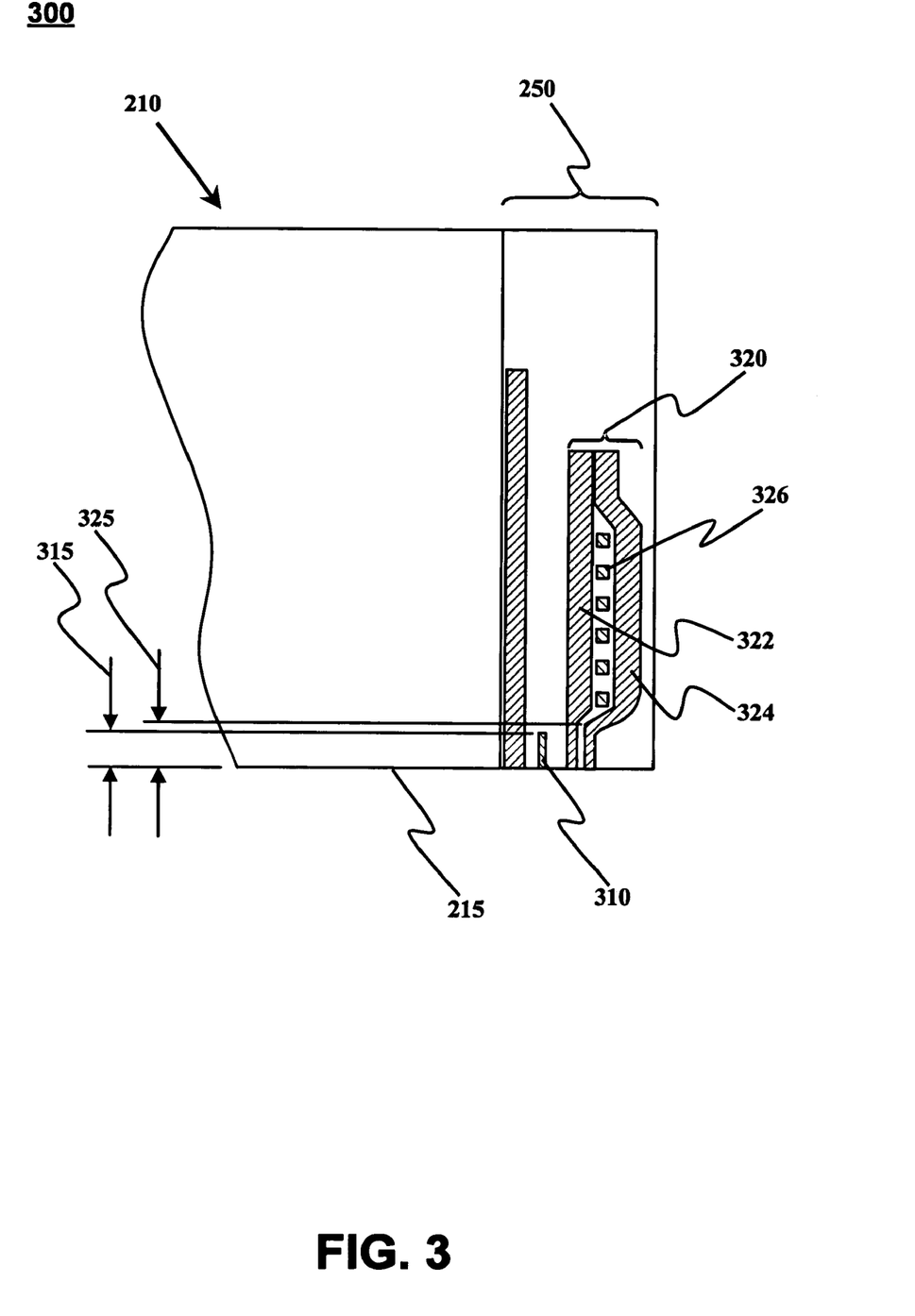
FIG. 3 is cross-section of a slider in a row quad in accordance with current practice of a present manufacturing line.

With reference now to FIG. 3, cross-section 300 of potential slider 210 and magnetic transducer 250 in a row quad is shown in accordance with a current practice of a manufacturing process. For brevity and clarity, only the major components of magnetic transducer 250 are shown. Cross-section 300 is not to scale. Magnetic transducer 250 and ELG 255 (FIG. 2) are fabricated simultaneously with similar photolithographic processes. Simultaneous fabrication provides an accurate alignment of an electrical resistive component of ELG 255 to a magneto-resistive component of magnetic transducer 250. This magneto-resistive component is typically referred to as an MR stripe 310.

Write head 320 comprises a first pole piece 322, a second pole piece 324, and a coil 326. The distance wherein first pole piece 322 and second pole piece 324 are separated and parallel, and are bounded by surface 215 is typically referred to as throat height 325. The distance from surface 215 to the opposite extremity of MR stripe 310 is typically referred to as stripe height 315. Lapping surface 215 simultaneously determines stripe height 315, throat height 325, and establishes the initial surface on slider 210 for defining the ABS. Typically an ELG 255 is positioned between at most every magnetic transducer 250. Resistance of at least one ELG is measured and used to control force vector 120 applied to lapping device 100 such that stripe height 315 and throat height 325 of magnetic transducer 250 are lapped properly.

Figure 4:
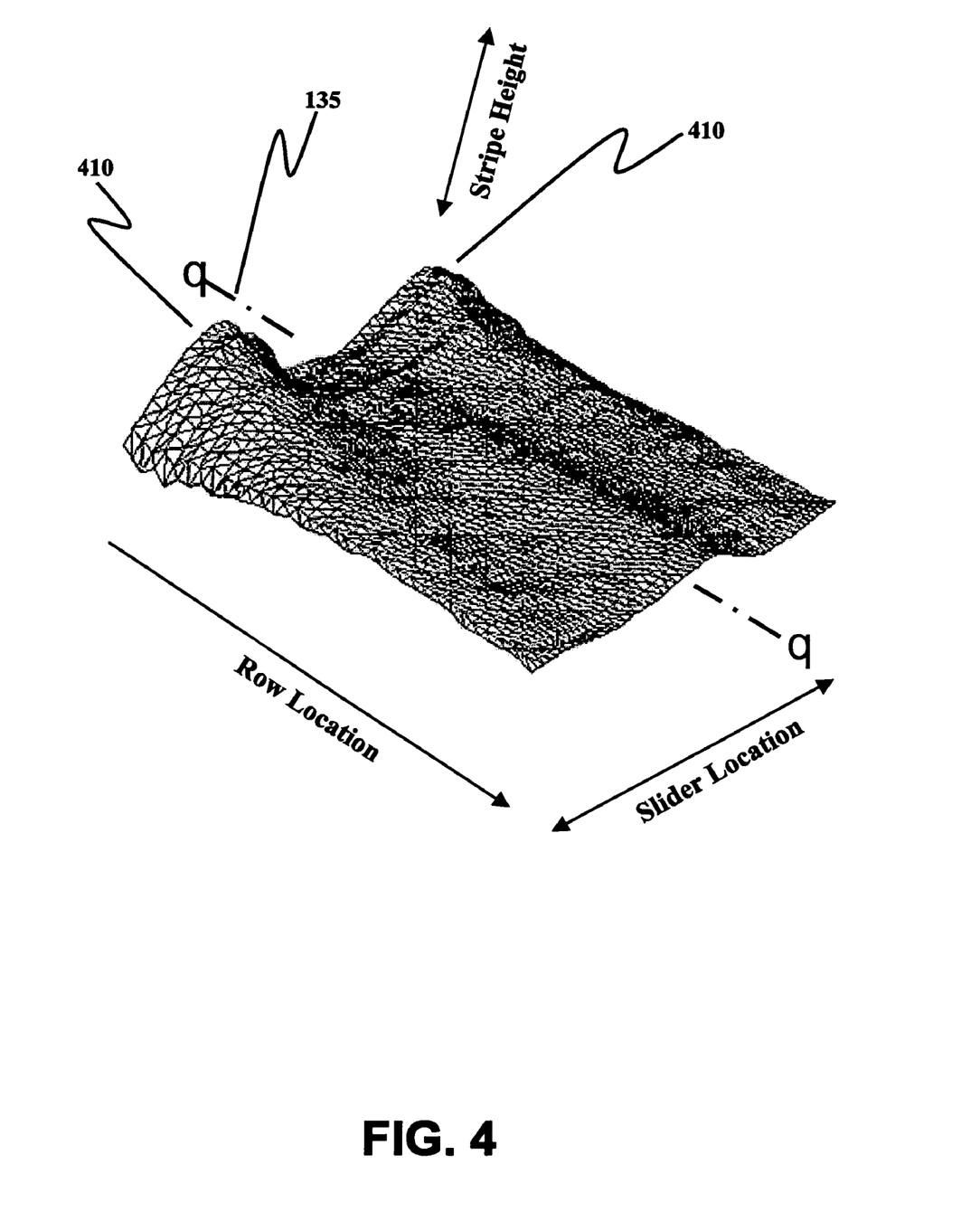
FIG. 4 is graphic representation of average mechanical distortion in a row quad vs. average target flatness in accordance with current practice of a present manufacturing line.

With reference now to FIG. 4, a graphic representation of row distortion in a row quad is presented in accordance with current practice of a present manufacturing line. It can be seen that by implying the stripe height with the resistance measurements of the ELGs, large distortions 410 exists in rows that are more closely coupled to lapping device 100 and are approximately opposite the location of rotation points 130. Row distortions diminish as the row location proceeds away from lapping device 100. Row distortions appear symmetric with centerline 135.

The presented row distortion in FIG. 4 alludes to the challenge of assuring consistent stripe height and throat height control. In order to meet the more stringent demands for stripe height and throat height control of future products, more controllability must be devised without adding appreciable cost to the manufacturing process.

The following embodiments of the present invention solve the problem of stripe height and throat height control without adding appreciably to the manufacturing cost. Pivotal to keeping the impact to manufacturing cost low is to devise tooling that will interface easily with current practice of a present manufacturing line.

Physical Description

Figure 5:
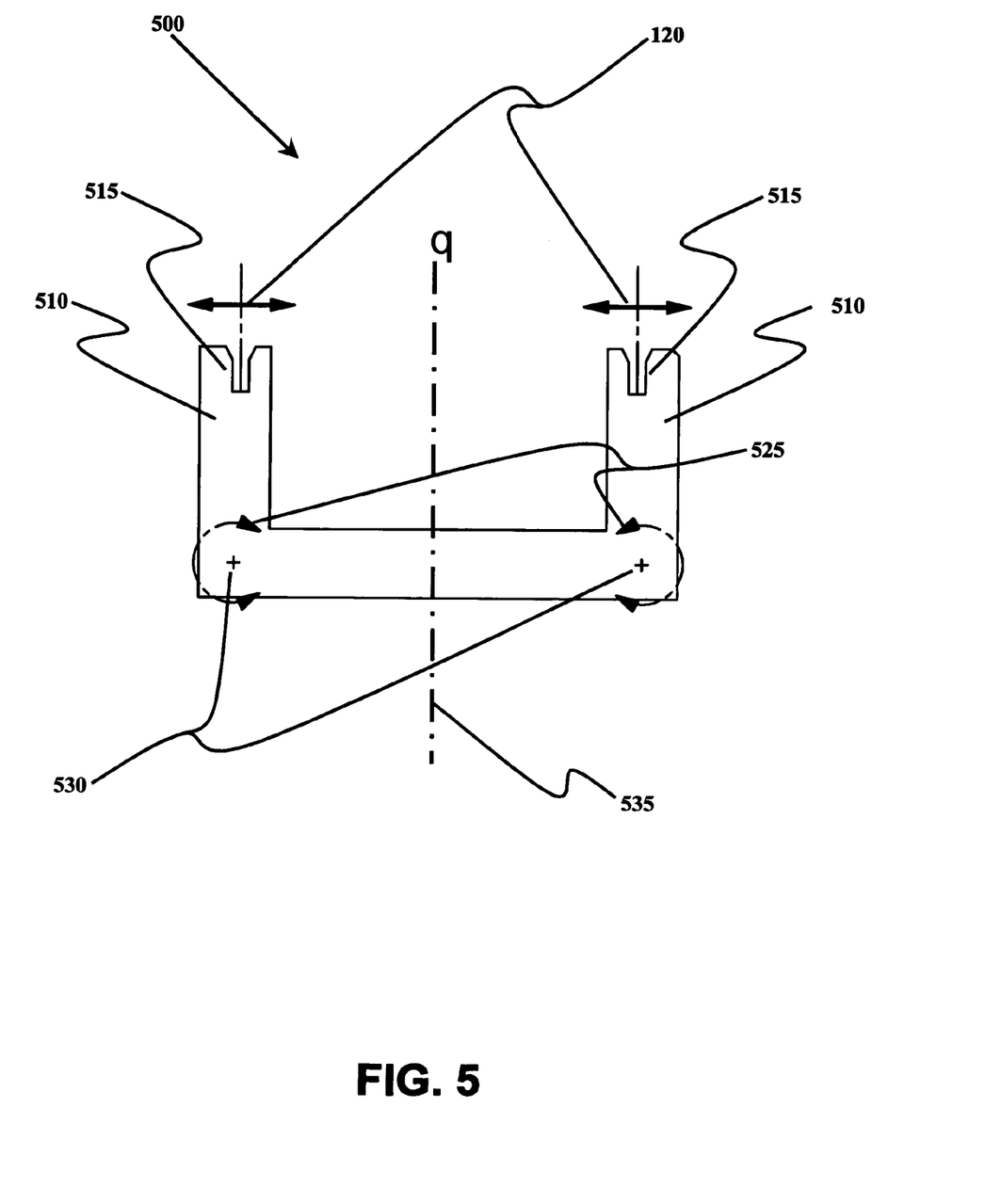
FIG. 5 is a plan view of a lapping device in accordance with one embodiment of the present invention.

With reference to FIG. 5, a plan view is presented of a lapping device in accordance with one embodiment of the present invention. Lapping device 500 comprises at least one lever arm 510. A coupling feature 515 is located at the end of lever arm 510. Coupling feature 515 receives a force-vectoring device such as a pneumatic piston or a solenoid. The direction of the force vector 120 can be determined by the orientation of a pneumatic piston or solenoid, which can push or pull on coupling feature 515. Pneumatic pressure delivered to a pneumatic piston or current delivered to a solenoid can determine the magnitude of force vector 120. It should be obvious to one schooled in the art that force vector 120 is not limited to horizontal or vertical orientation, and any combination of force vectors can be superimposed upon one another to produce a desirably controlled force vector 120.

Force vector 120, as well as coupling feature 515, and lever arm 510 are typically symmetric about centerline 535 of lapping device 500. In accordance with an embodiment of the present invention, by properly controlling force vector 120, rotation 525 can be produced about rotation points 530. Rotation points 530 are defined by the geometry of lapping device 500 and are opposite coupling feature 515 of lever arm 510. The geometry of lapping device 500 allows localized flexing to occur at rotation points 530 during application of force vector 120.

In accordance with an embodiment of the present invention, the profile of lapping device 500 is constant across all slider sizes, e.g. from Pico to Femto. Thickness 550 of lapping device 500 varies accordingly to match the length of the slider being lapped. Since coupling features 515, and lever arms 510 are similar to coupling features 115, and lever arms 110 of a current manufacturing process, support manufacturing equipment and processes can be remain with little to no change.

Figure 5A:
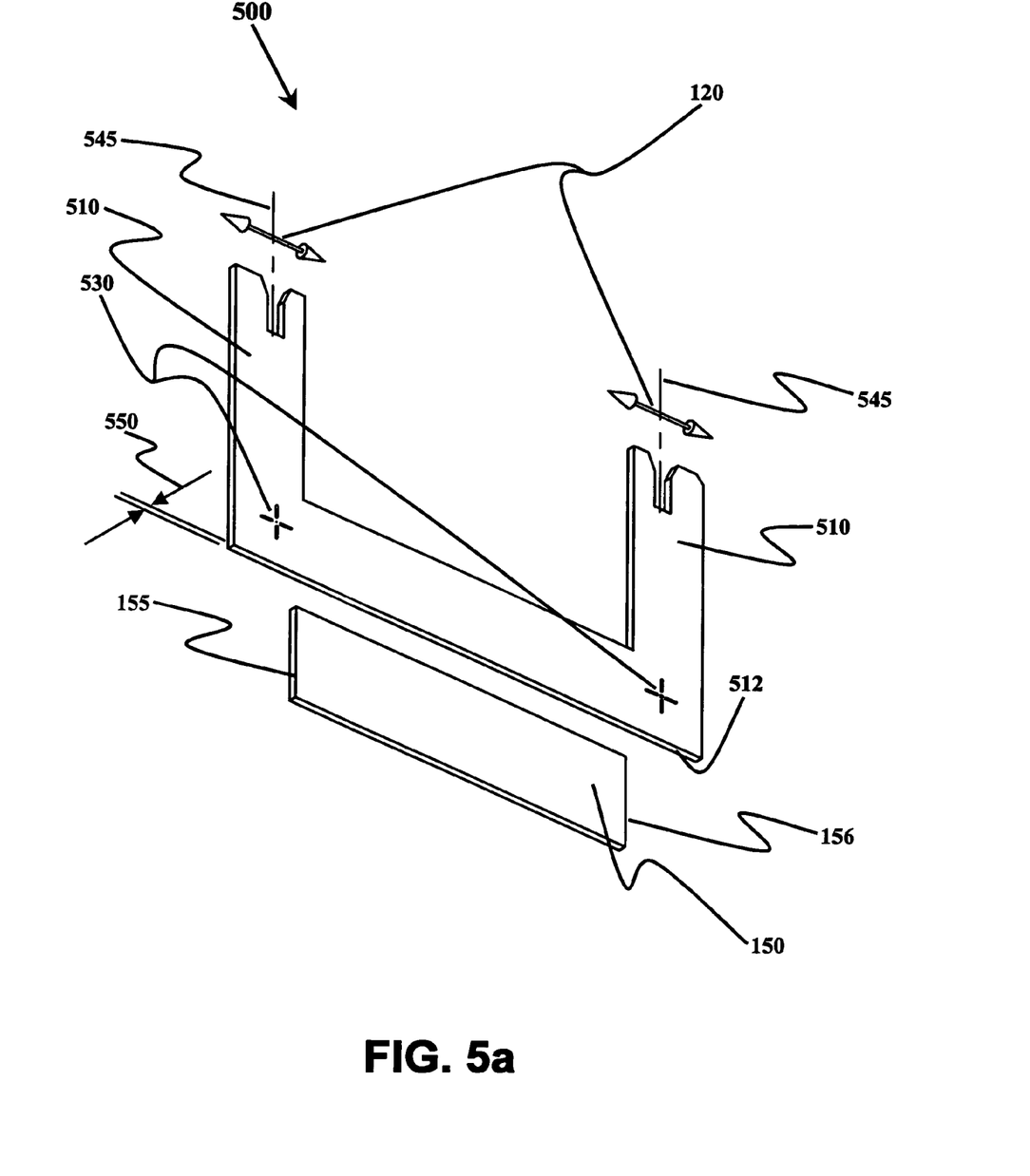
FIG. 5a is an isometric blow-apart of a lapping device and a mounted row quad in accordance with one embodiment of the present invention.

With reference now to FIG. 5a, an isometric blow-apart of lapping device 500 and a mounted row quad 150 is shown in accordance with one embodiment of the present invention. Row quad 150 is adhesively bonded to mounting surface 512 of lapping device 500. The longitudinal axis 545 of lever arm 510 is approximately perpendicular to mounting surface 512. Rotation points 530 are located beyond distal end 155 and/or 156 of row quad 150. By properly controlling force vector 120, and causing rotation 525 (FIG. 5) to occur beyond distal end 155 and/or 156, a curvature is imparted into row quad 150 that typically counteracts the distortion in row quad 150 that typically results from internal stresses in the wafer.

Similarly to a current manufacturing process there is at least one electrical resistance-measuring device, or ELG, per non-parted slider row. An ELG resides between at most every magnetic transducer on the non-parted slider row. A resistive component of the ELG is aligned to the MR stripe of the magnetic transducer, and resistance measurements from the ELG are used to infer the MR stripe height and throat height during the lapping process.

Figure 6:
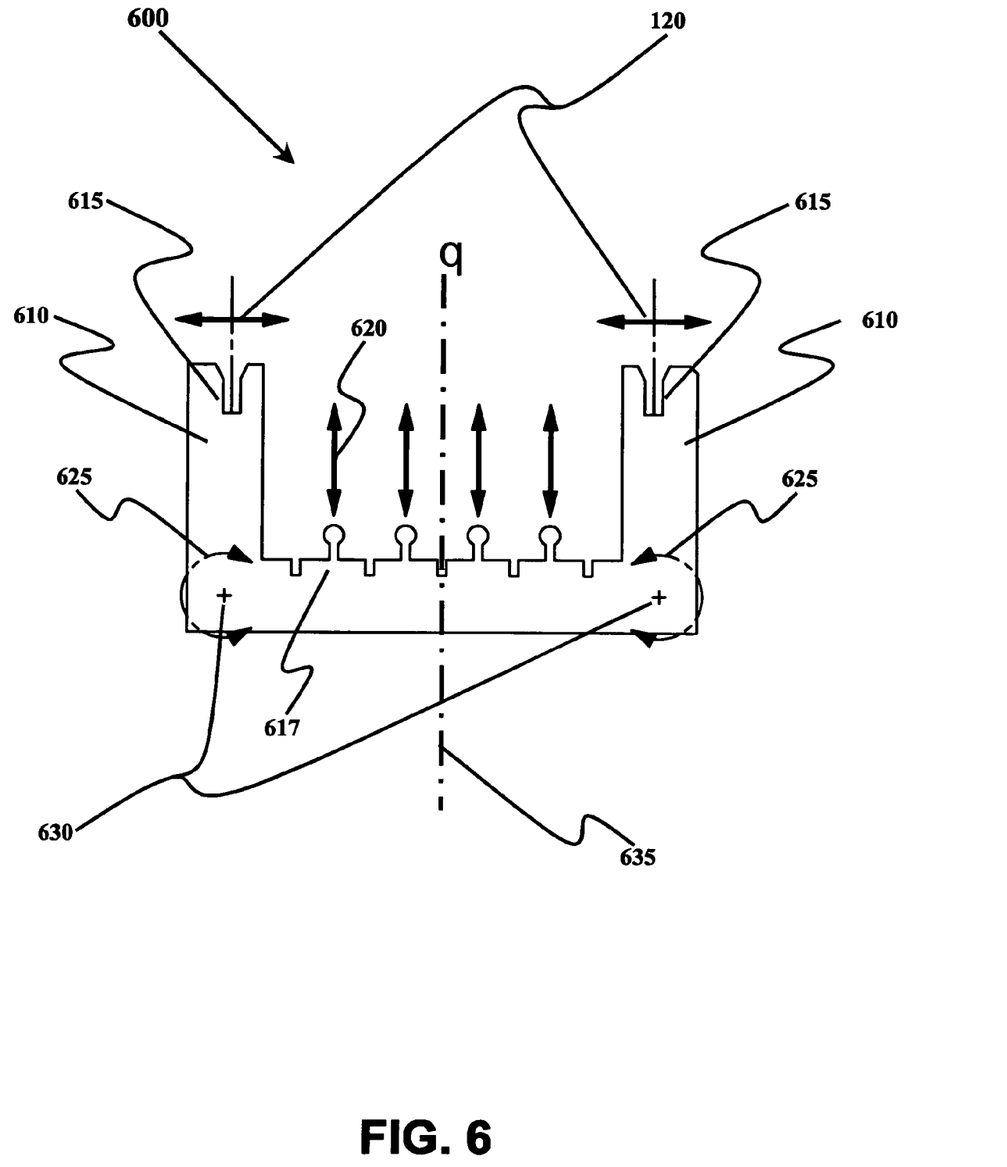
FIG. 6 is a plan view of a lapping device in accordance with one embodiment of the present invention.

With reference to FIG. 6, a plan view is presented of a lapping device in accordance with one embodiment of the present invention. Lapping device 600 comprises at least one lever arm 610. A coupling feature 615 is located at the end of lever arm 610. Coupling feature 615 receives a force-vectoring device such as a pneumatic piston or a solenoid. The direction of the force vector 120 can be determined by the orientation of a pneumatic piston or solenoid, which can push or pull on coupling feature 615. Pneumatic pressure delivered to a pneumatic piston or current delivered to a solenoid can determine the magnitude of force vector 120. It should be obvious to one schooled in the art that force vector 120 is not limited to horizontal or vertical orientation, and any combination of force vectors can be superimposed upon one another to produce a desirably controlled force vector 120.

In accordance with an embodiment of the present invention, at least one coupling feature 617 is fabricated between at least two coupling features 615. Coupling feature 617 receives a force-vectoring device such as a pneumatic piston or a solenoid. The direction of the force vector 620 can be determined by the orientation of a pneumatic piston or solenoid, which can push or pull on coupling feature 617. Pneumatic pressure delivered to a pneumatic piston or current delivered to a solenoid can determine the magnitude of force vector 620. It should be obvious to one schooled in the art that force vector 620 is not limited to horizontal or vertical orientation, and any combination of force vectors can be superimposed upon one another to produce a desirably controlled force vector 620.

Force vectors 120 and 620, as well as coupling features 615 and 617, and lever arm 610 are typically symmetric about centerline 635 of lapping device 600. In accordance with an embodiment of the present invention, by properly controlling force vector 120, rotation 625 can be produced about rotation points 630. Rotation points 630 are defined by the geometry of lapping device 600 and are opposite coupling feature 615 of lever arm 610. The geometry of lapping device 600 allows localized flexing to occur at rotation points 630 during application of force vector 120.

In accordance with an embodiment of the present invention, the profile of lapping device 600 is constant across all slider sizes, e.g. from Pico to Femto. Thickness 650 of lapping device 600 varies accordingly to match the length of the slider being lapped. Since coupling features 615, and lever arms 610 are similar to coupling features 115, and lever arms 110 of a current manufacturing process, support manufacturing equipment and processes can be remain with little to no change.

Figure 6A:
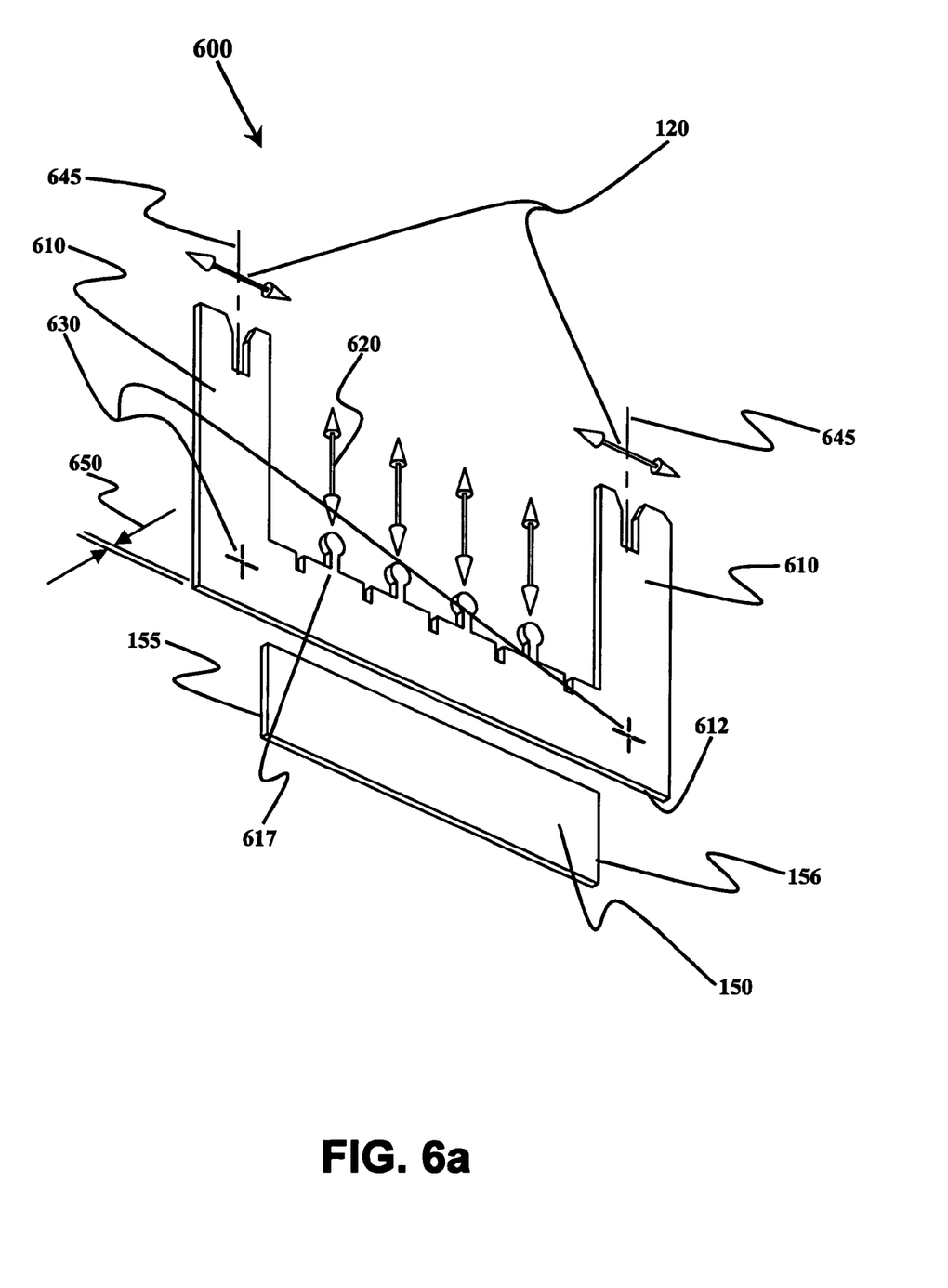
FIG. 6a is an isometric blow-apart of a lapping device and a mounted row quad in accordance with one embodiment of the present invention.

With reference now to FIG. 6a, an isometric blow-apart of lapping device 600 and a mounted row quad 150 is shown in accordance with one embodiment of the present invention. Row quad 150 is adhesively bonded to mounting surface 612 of lapping device 600. The longitudinal axis 645 of lever arm 610 is approximately perpendicular to mounting surface 612. Coupling feature 617 is opposite mounting surface 612 and can receive force vector approximately perpendicularly to mounting surface 612. Rotation points 630 are located beyond distal end 155 and/or 156 of row quad 150. By properly controlling force vector 120, rotation 625 (FIG. 6) occurs beyond distal end 155 and/or 156. A curvature is imparted into row quad 150. By properly controlling force vector 620 linear deflection can be superimposed onto the imparted curvature in row quad 150 from force vector 120. Typically the linear deflection from force vector 620 and the imparted curvature from force vector 120 will counter acts the distortion in row quad 150 that typically results from internal stresses in the wafer.

Similarly to a current manufacturing process there is at least one electrical resistance-measuring device, or ELG, per non-parted slider row. An ELG resides between at most every magnetic transducer on the non-parted slider row. A resistive component of the ELG is aligned to the MR stripe of the magnetic transducer, and resistance measurements from the ELG are used to infer the MR stripe height and throat height during the lapping process.

Operation

Figure 7:
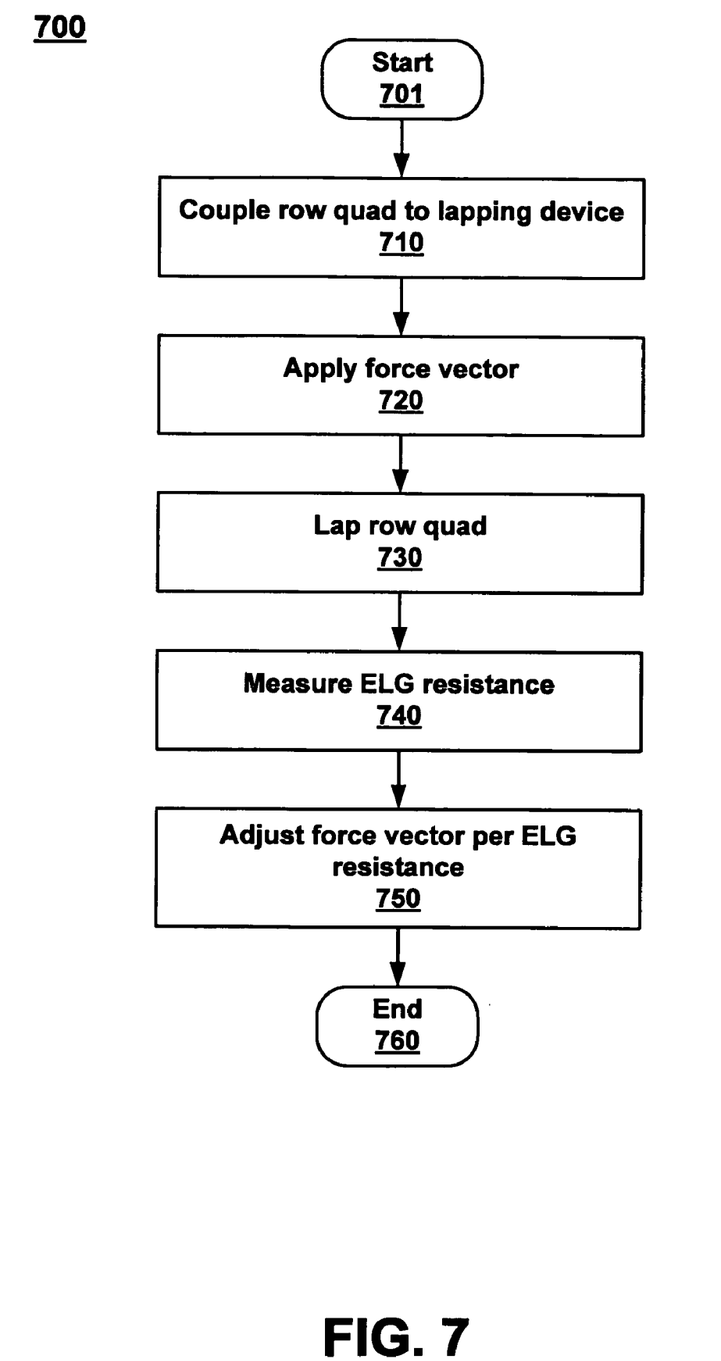
FIG. 7 is a flow chart illustrating steps of a fabrication process for row lapping in accordance with one embodiment of the present invention.

FIG. 7 is a flow chart of a process 700 in which particular steps are performed in accordance with an embodiment of the present invention for lapping a row to compensate for distortions, typically caused by internal stresses, which have resulted in the row to become bowed. FIG. 7 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 700, such steps are exemplary. That is, the present invention is well suited to performing various other steps or variations of the steps recited in FIG. 7. Within the present embodiment, it should be appreciated that the steps of process 700 may be performed by software, by hardware, by an assembly mechanism, through human interaction, or by any combination of software, hardware, assembly mechanism, and human interaction.

In step 701 of process 700 a row quad and a lapping device are introduced into process 700 in an embodiment of the present invention. The row quad may comprise a varying number of rows and sliders depending on the slider size being processed through process 700. Typically the smaller the slider size, e.g. Femto compared to Pico, the greater number of rows and/or sliders are comprised in the row quad.

In step 710 of process 700 the row quad is coupled to the lapping device in an embodiment of the present invention. Coupling the row quad to the lapping device may comprise adhesively bonding the row quad to the lapping device. The adhesive may comprise a two-part epoxy or a thermal melting adhesive. Coupling the row quad to the lapping device may also comprise electrically coupling at least one ELG of the first row to be lapped in the row quad to instrumentation for measuring ELG resistance.

In step 720 of process 700 a force vector is applied to the lapping device in an embodiment of the present invention. A coupling feature on the lapping device may receive the force vector. The coupling feature allows quick and robust coupling of the lapping device to a force-vectoring device. The force-vectoring device may control the magnitude as well as the direction of the force vector.

In accordance with an embodiment of the present invention, applying the force vector in step 720 of process 700 comprises coupling a force vector to at least one lever arm of the embodied lapping device presented in FIGS. 5 and 5*a*. Coupling force vector 120 to lever arm 510 provides bending about rotation points 530 and reduces large distortions 410 presented in FIG. 4.

In accordance with an embodiment of the present invention, applying the force vector in step 720 of process 700 comprises coupling a force vector to at least one lever arm of the embodied lapping device presented in FIGS. 6 and 6*a*, and coupling at least one force vector approximately perpendicularly to the mounting surface wherein the row quad is coupled. Coupling force vector 120 to lever arm 610 provides bending about rotation points 530. Additionally coupling force vector 620 approximately perpendicularly to the mounting surface wherein the row quad is coupled reduces large distortions 410 and allows further reduction of other distortions presented in FIG. 4.

In step 730 of process 700 the row quad is lapped in an embodiment of the present invention. The exposed surface of the first row in the row quad is pressed against a lapping medium by the force vector. The lapping medium is moving relative to the exposed surface of the first row in the row quad. The lapping medium is typically embedded with diamond particles, which are of an appropriate size to effectively remove the desired amount of exposed surface of the first row in the row quad.

In step 740 of process 700 the resistance of the ELG is measured in an embodiment of the present invention. Since the positional relationship between the ELG and the magnetic transducer are well defined and known, the resistance of the ELG is a direct correlation to the MR stripe height of the magnetic transducer. The positional relationship between features within the magnetic transducer that define the MR stripe and the throat of the magnetic transducer are well defined and known. The resistance of the ELG is also a direct correlation to the throat height of the magnetic transducer.

In step 750 of process 700 the force vector is adjusted in accordance to the measured ELG resistance in an embodiment of the present invention. The magnitude as well as the direction of the force vector may be controlled in accordance to the resistance measured from the ELG. For example, in the case of a pneumatic cylinder more or less air pressure can be added to the cylinder to control the magnitude of the force vector. Air can be injected at either end of a dual-acting cylinder to reverse the direction of the force vector. Since the resistance measured from the ELG is directly related to MR stripe height, the force vector can be adjusted to assure that the MR stripe height for approximately all magnetic transducers in the non-parted row quad are of the same height. By assuring that approximately all MR stripe heights across the non-parted row are of uniform height, the bow of the non-parted slider row is compensated. Typically measurements of ELG resistance from multiple ELGs in a non-parted row improve the accuracy of achieving the desired MR stripe height.

Advantageously, the present invention, in the various presented embodiments allows for the compensation of distortions in the non-parted row, which if left uncompensated would reduce magnetic transducer fabrication yields. The present invention in the presented embodiments compensates for distortions that are typically seen as a bowing of the row due to internal stresses from the wafer manufacturing process. However, row bow regardless of the cause is compensated for by virtue of the various presented embodiments of the present invention. Additional advantage is realized in that the row bow compensation presented in the embodiments of the present invention, have minimal impact on the current manufacturing processes and therefore can be implemented with minimal cost impact to existing tooling and support equipment.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A lapping device comprising:
   a mounting surface for coupling at least one non-parted slider row; and
   at least one lever arm coupled to at least one distal end of said mounting surface wherein said lever arm comprises;
      a coupling feature at an end of said lever arm for receiving a force-vectoring device; and
      a pivot point opposite said coupling feature of said lever arm wherein said pivot point is beyond a distal end of said non-parted slider row.

2. The lapping device of claim 1 wherein said non-parted slider row comprises at least one electrical resistance-measuring device.

3. The lapping device of claim 2 wherein said electrical resistance-measuring device resides between at most every magnetic transducer of said non-parted slider row.

4. The lapping device of claim 3 wherein said electrical resistance-measuring device comprises an electrically resistive component aligned to a magneto-resistive component of said magnetic transducer.

5. The lapping device of claim 1 wherein said lever arm is approximately perpendicular to said mounting surface which couples said non-parted slider row.

6. The lapping device of claim 1 wherein said pivot point is defined by localized flexing of said lapping device.

7. The lapping device of claim 1 wherein a plan view profile is constant across multiple slider form factors.

8. The lapping device of claim 1 wherein the thickness of said lapping device varies in accordance to a slider length.

9. A lapping device comprising:
   a mounting surface for coupling at least one non-parted slider row;
   at least one lever arm coupled to at least one distal end of said mounting surface wherein said lever arm comprises;
      a coupling feature at an end of said lever arm for receiving a force-vectoring device; and
      a pivot point opposite said coupling feature of said lever arm wherein said pivot point is beyond a distal end of said non-parted slider row; and
   at least one coupling feature opposite said mounting surface whereby at least one force-vectoring device is received.

10. The lapping device of claim 9 wherein said non-parted slider row comprises at least one electrical resistance-measuring device.

11. The lapping device of claim 10 wherein said electrical resistance-measuring device resides between at most every magnetic transducer of said non-parted slider row.

12. The lapping device of claim 11 wherein said electrical resistance-measuring device comprises an electrically resistive component aligned to a magneto-resistive component of said magnetic transducer.

13. The lapping device of claim 9 wherein said lever arm is approximately perpendicular to said mounting surface which couples said non-parted slider row.

14. The lapping device of claim 9 wherein said pivot point is defined by localized flexing of said lapping device.

15. The lapping device of claim 9 wherein a plan view profile is constant across multiple slider form factors.

16. The lapping device of claim 9 wherein the thickness of said lapping device varies in accordance to a slider length.

17. A method of bow compensation lapping, said method comprising:
   coupling at least one non-parted slider row to a mounting surface;
   applying a force vector to said mounting surface whereby said non-parted row is bent about a pivot point beyond at least one distal end of said non-parted slider row;
   lapping a surface of said non-parted slider row wherein said surface is opposite said mounting surface;
   measuring electrical resistance of at least one electrical lapping guide wherein said electrical lapping guide is being lapped coincidentally with a magnetic transducer; and
   adjusting said force vector in accordance with said electrical resistance measured from said electrical lapping guide thereby compensating for the bow of the non-parted slider row.

18. The method of claim 17, wherein said applying said force vector to said mounting surface whereby said non-parted row is bent about a pivot point beyond at least one distal end of said non-parted slider row comprises:
   coupling a force-vectoring device to at least one lever arm wherein said lever arm is coupled to said mounting surface, wherein said pivot point of said lever arm is beyond said distal end of said non-parted slider row.

19. The method of claim 17, wherein said applying said force vector to said mounting surface whereby said non-parted row is bent about a pivot point beyond at least one distal end of said non-parted slider row comprises:
   coupling at least one force-vectoring device to said mounting surface whereby said force-vectoring device applies a force vector approximately perpendicular to said mounting surface.

20. The method of claim 17, wherein said applying said force vector to said mounting surface whereby said non-parted row is bent about a pivot point beyond at least one distal end of said non-parted slider row comprises:
   applying a force vector whereby said force vector has reversible direction.

21. The method of claim 17, wherein said adjusting said force vector is in accordance with measuring said electrical resistance from more than one electrical lapping guide.

* * * * *